United States Patent

Higdon et al.

Patent Number: 5,115,832
Date of Patent: May 26, 1992

[54] TIRE PRESSURE GAUGE AND CAP APPARATUS

[76] Inventors: John S. Higdon, 1007 S. 38th Ave., Yakima, Wash. 98902; Douglas W. Capen, 326/204 Highland Dr., Glen Burnie, Md. 21061

[21] Appl. No.: 733,176

[22] Filed: Jul. 19, 1991

[51] Int. Cl.$^5$ .............................................. B60C 23/02
[52] U.S. Cl. .................................. 137/227; 137/559; 73/146.8; 116/34 R
[58] Field of Search ............... 137/227, 229, 557, 559; 73/146.3, 146.8; 116/34 R

[56] References Cited

U.S. PATENT DOCUMENTS

| | | | |
|---|---|---|---|
| 2,329,039 | 9/1943 | Fenwick | 73/146.8 |
| 2,417,449 | 3/1947 | Rubin | 73/146.8 |
| 2,689,481 | 9/1954 | Quiat | 73/146.8 |
| 2,704,045 | 3/1955 | Riesing | 116/34 R |
| 3,111,930 | 11/1963 | Zipper | 73/146.8 X |
| 3,241,514 | 3/1966 | Grimland | 116/34 R X |
| 3,380,427 | 4/1968 | Rubin | 116/34 R |
| 3,452,708 | 7/1969 | Richardson | 73/146.8 X |
| 3,780,693 | 12/1973 | Parr | 73/146.8 X |
| 4,366,708 | 1/1983 | Warihashi | 73/146.8 |
| 4,729,337 | 3/1988 | Schopp | 116/34 R |
| 4,819,686 | 4/1989 | Achterholt | 137/227 X |

*Primary Examiner*—John Rivell
*Attorney, Agent, or Firm*—Leon Gilden

[57] ABSTRACT

An apparatus including a body tube coaxially mounting an internally threaded lower cylindrical skirt at a lower terminal end thereof for securement to a valve member of a conventional automotive tire. An apertured cylindrical web is mounted adjacent an intersection of the tube and cylindrical skirt, including an axial rod fixedly mounted projecting coaxially of the skirt for projection and depressing of a central displacement needle seat, as utilized in automotive valves. A flexible web formed of memory retentent material is mounted adjacent an upper terminal end of the tube below a translucent viewing lens. The web includes a rigid boss member mounted thereon, whereupon proper inflation within an associated tire permits projection of the boss against the translucent lens for viewing of the boss' indica of proper inflation, whereupon deflation permitting the web to deflect and displace the boss relative to the lens provides visual indication of underinflated condition.

1 Claim, 4 Drawing Sheets

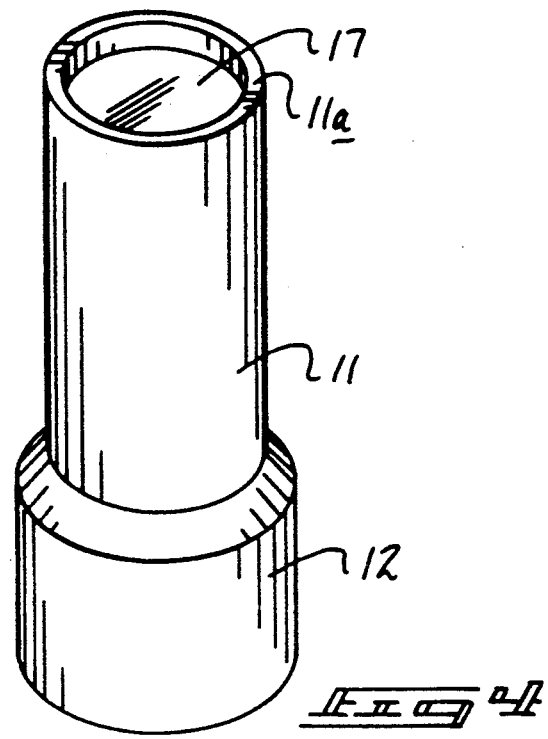
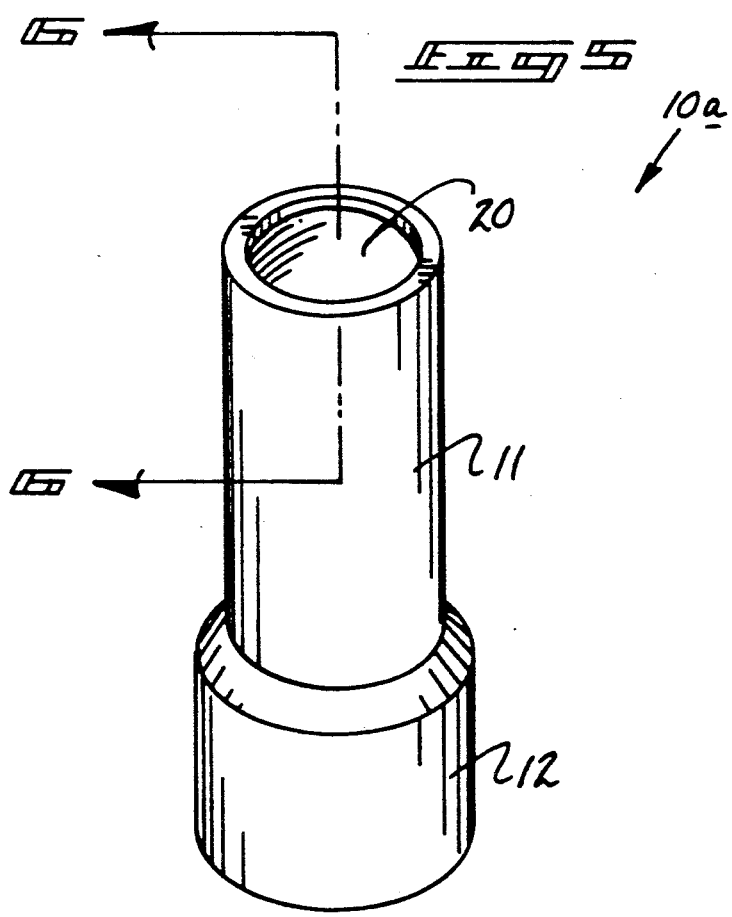

TIRE PRESSURE GAUGE AND CAP APPARATUS

BACKGROUND OF THE INVENTION

1. Field of the Invention

The field of invention relates to pressure gauges, and more particularly pertains to a new and improved tire pressure gauge and cap apparatus wherein the same is operative to effect visual indication of proper inflation of an associated tire.

2. Description of the Prior Art

Inflation apparatus of various types are utilized in the prior art, and particularly there are examples of tire pressure gauges utilized in the prior art for indication of inflation relative to an associated automotive tire. Such is exemplified in U.S. Pat. No. 4,464,929 to Willis wherein a rod member projects coaxially relative to a cylindrical body that in turn is mounted to an inflation valve of an automotive tire to mechanically indicate proper inflation within the tire.

U.S. Pat. No. 3,610,269 to Adams sets forth a further example of a pressure gauge for use with an automotive tire utilizing a central mechanical plunger.

U.S. Pat. No. 4,924,697 to Hunt, et al. sets forth an apparatus for mounting a pressure gauge with a displaceable indicator needle for visual indication of relative pressure within an associated tire.

U.S. Pat. No. 4,901,747 to Yabor and U.S. Pat. No. 4,793,177 to Wu, et al. are further examples of mechanical inflation gauges relative to automotive tires.

As such, it may be appreciated that there continues to be a need for a new and improved tire pressure gauge and cap apparatus as set forth by the instant invention which addresses both the problems of ease of use as well as effectiveness in construction in providing a completely sealed gauge structure to effect visual indication of proper inflation with an automotive tire and in this respect, the present invention substantially fulfills this need.

SUMMARY OF THE INVENTION

In view of the foregoing disadvantages inherent in the known types of inflation valve apparatus now present in the prior art, the present invention provides a tire pressure gauge and cap apparatus wherein the same is arranged to indicate proper inflation within an associated automotive tire. As such, the general purpose of the present invention, which will be described subsequently in greater detail, is to provide a new and improved tire pressure gauge and cap apparatus which has all the advantages of the prior art pressure gauge apparatus and none of the disadvantages.

To attain this, the present invention provides an apparatus including a body tube coaxially mounting an internally threaded lower cylindrical skirt at a lower terminal end thereof for securement to a valve member of a conventional automotive tire. An apertured cylindrical web is mounted adjacent an intersection of the tube and cylindrical skirt, including an axial rod fixedly mounted projecting coaxially of the skirt for projection and depressing of a central displacement needle seat, as utilized in automotive valves. A flexible web formed of memory retentent material is mounted adjacent an upper terminal end of the tube below a translucent viewing lens. The web includes a rigid boss member mounted thereon, whereupon proper inflation within an associated tire permits projection of the boss against the translucent lens for viewing of the boss' indicia of proper inflation, whereupon deflaction permitting the web to deflect and displace the boss relative to the lens provides visual indication of an underinflated condition.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tire pressure gauge and cap apparatus which has all the advantages of the prior art pressure gauge apparatus and none of the disadvantages.

It is another object of the present invention to provide a new and improved tire pressure gauge and cap apparatus which may be easily and efficiently manufactured and marketed.

It is a further object of the present invention to provide a new and improved tire pressure gauge and cap apparatus which is of a durable and reliable construction.

An even further object of the present invention is to provide a new and improved tire pressure gauge and cap apparatus which is susceptible of a low cost of manufacture with regard to both materials and labor, and which accordingly is then susceptible of low prices of sale to the consuming public, thereby making such tire pressure gauge and cap apparatus economically available to the buying public.

Still yet another object of the present invention is to provide a new and improved tire pressure gauge and cap apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of the instant invention.

FIG. 5 is an isometric illustration of a modification of the invention.

DESCRIPTION OF THE PREFERRED EMBODIMENT

Figure 1:
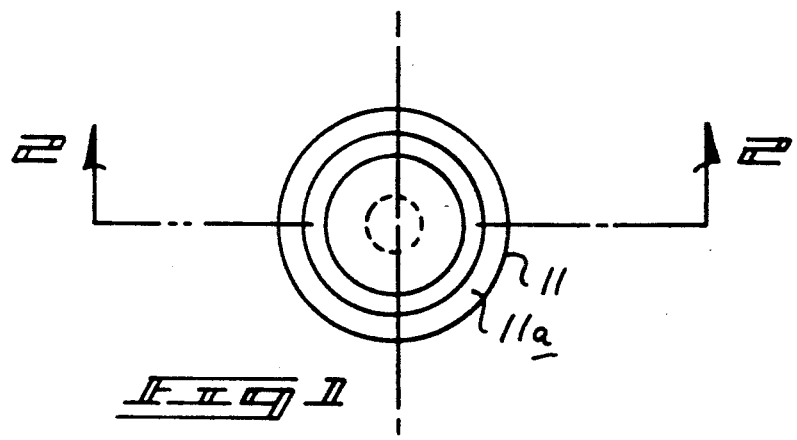
FIG. 1 is a top orthographic view of the instant invention.
Figure 2:
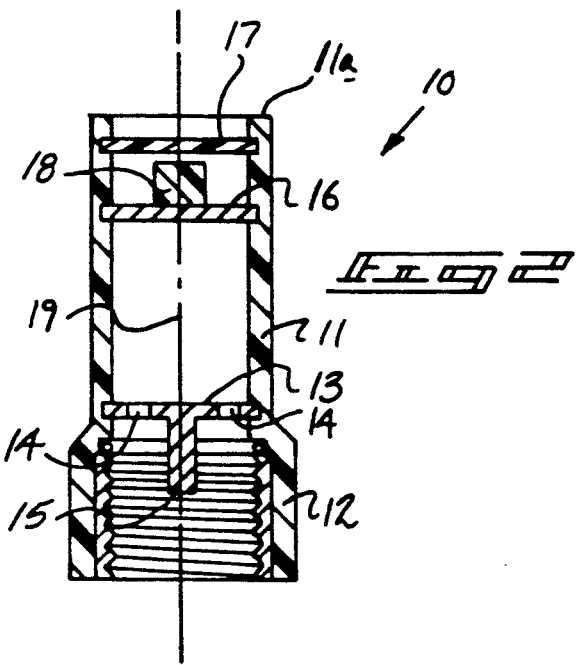
FIG. 2 is an orthographic view, taken along the lines 2—2 of FIG. 1 in the direction indicated by the arrows.
Figure 3:
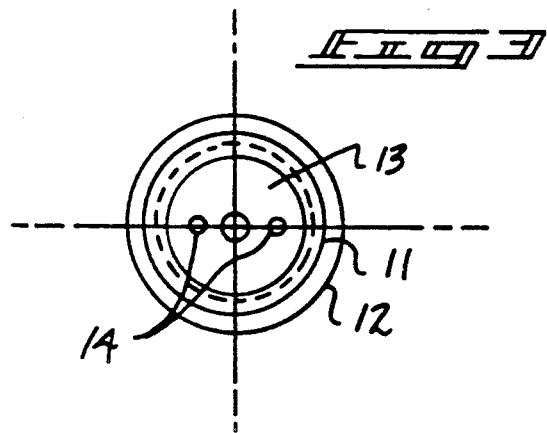
FIG. 3 is an orthographic cross-sectional illustration of the lower cylindrical web and associated axial rod for projection into an associated automotive valve.

With reference now to the drawings, and in particular to FIGS. 1 to 8 thereof, a new and improved tire pressure gauge and cap apparatus embodying the principles and concepts of the present invention and generally designated by the reference numerals 10, 10a, and 10b will be described.

More specifically, the tire pressure gauge and cap apparatus 10 of the instant invention essentially comprises a body tube 11 integrally mounting an internally threaded lower cylindrical skirt 12 at a lower terminal end of the body tube coaxially aligned relative to the body tube along a central axis 19. A cylindrical web 13 is fixedly mounted adjacent a lower terminal end of the tube 11 at the intersection with the skirt 12 orthogonally oriented relative to the axis 19, including a plurality of apertures 14 directed therethrough. An axle rod 15 is fixedly and orthogonally mounted coaxially of the cylindrical web 13 projecting downwardly therefrom projecting coaxially of the skirt 12 for projection onto a valve of an automotive tire, of a type as set forth in U.S. Pat. No. 4,464,929 incorporated herein by reference.

A flexible, transparent web 16 fixedly mounts a rigid opaque boss 18 medially and coaxially to a top surface of the flexible web 16, with a rigid cylindrical translucent lens 17 mounted adjacent to and above the boss 18, wherein the boss 18 is spaced from the rigid cylindrical translucent lens 17 in absence of pressurized air to effect deflection of the flexible web 16 upwardly. The boss 18 may further include indicia, such as a white dot or the like on a top surface thereof such that when imposed to the translucent lens 17 on a bottom surface thereof the boss 18 is more readily available. Deflection of the boss into communication with the lens 17 provides visual indication of adequate air by the calibrated flexible web 16 deflecting sufficiently upon a predetermined calibration to deflect the web 16 to direct the boss 18 upwardly, in a manner as described above.

Figure 6:
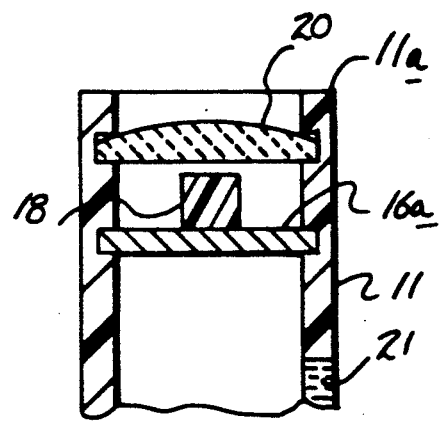
FIG. 6 is an orthographic view, taken along the lines 6—6 of FIG. 5 in the direction indicated by the arrows.
Figure 7:
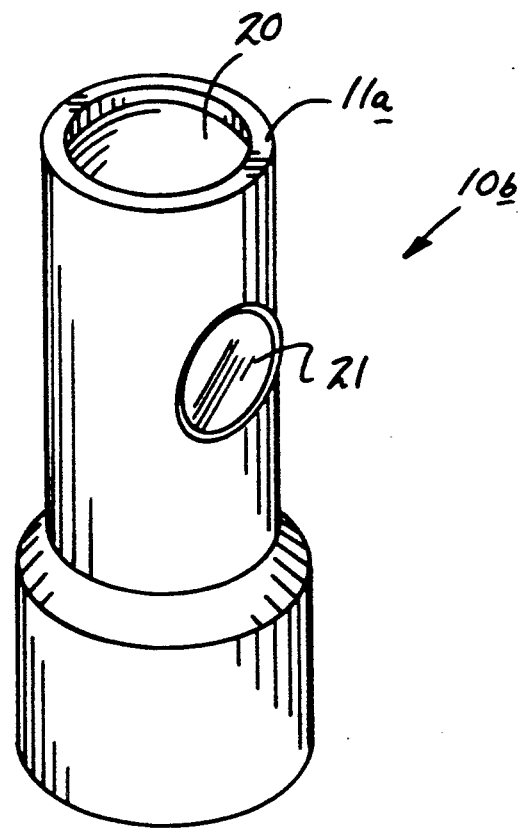
FIG. 7 is an isometric illustration of a further modified aspect of the invention.
Figure 8:
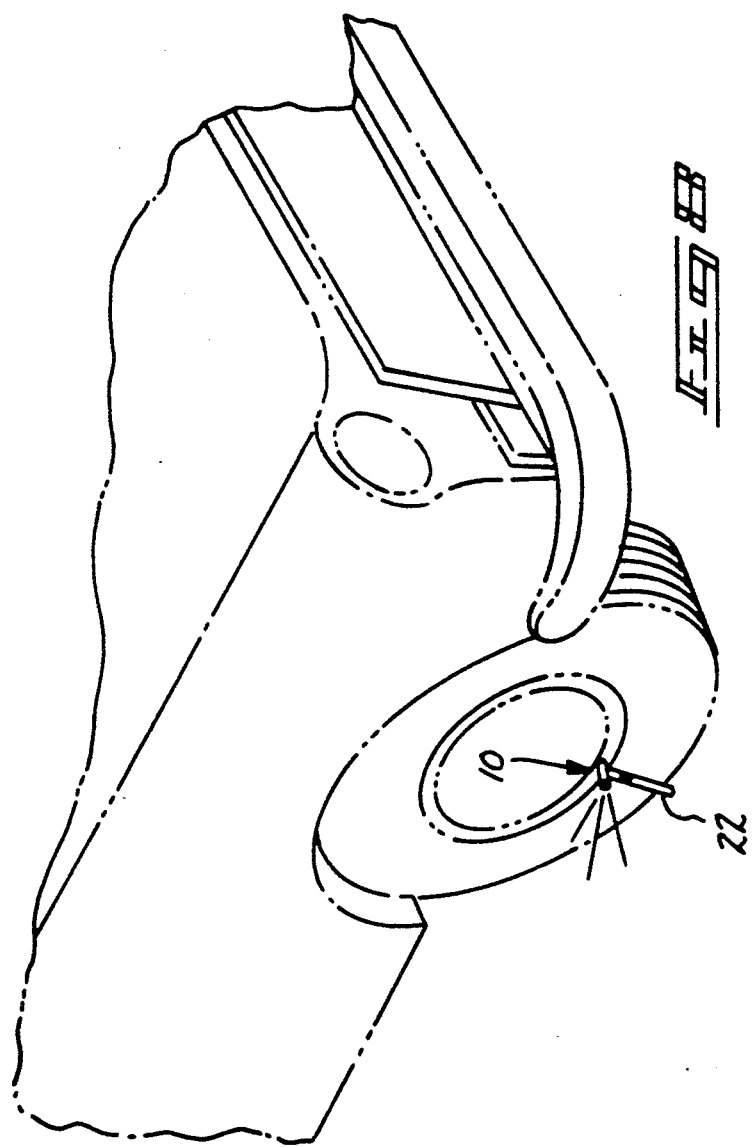
FIG. 8 is an isometric illustration of the invention in use.

A modification of the invention, as illustrated in FIGS. 5-7, utilizes a convex lens 20 in lieu of the translucent lens 17, wherein the convex lens 20 is translucent, with the lens 20 effecting magnification of the top surface of the boss 18 when in communication with the bottom surface of the lens 20. Further, a transparent lens 21 may be utilized, as illustrated in the modification 10b, as illustrated in FIG. 7, as opposed to the first modification 10a, as illustrated in FIG. 5, to include a transparent lens 21 directed through a side wall of the tube 11 to enhance illumination interiorly below the transparent flexible web 16, wherein an individual may direct artificial lights such as a flashlight 22 into the transparent lens 21 in addition to environmental light to enhance illumination of the boss and provide visual indication of its orientation relative to the lens 20. It is understood that upon improper or underinflation of an associated tire, the boss 18 will be spaced from the lens 20 or the aforenoted translucent lens 17 to indicate inadequate air pressure within an associated tire.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tire pressure gauge and cap apparatus, comprising,
    a body tube, the body tube including a lower terminal end and an upper terminal end, the lower terminal end including an internally threaded cylindrical skirt fixedly and coaxially mounted to the lower terminal end of the body tube, and
    a cylindrical web fixedly mounted within the body tube adjacent the lower terminal end, with the cylindrical web including a plurality of apertures directed therethrough, the cylindrical web formed of a rigid material and including an axle rod fixedly, orthogonally, and coaxially mounted to the cylindrical web projecting downwardly therefrom within the skirt, and
    a flexible web mounted within the body tube spaced from the upper terminal end of the body tube, and
    a translucent rigid lens mounted within the body tube between the upper terminal end and the flexible web, whereupon deflection of the flexible web effects projection of the flexible web towards a bottom surface of the translucent lens, and the flexible web is transparent and includes a rigid opaque boss member fixedly and coaxially mounted to a top surface of the flexible web, and the translucent lens defines a convex lens projecting towards the upper terminal end of the tube, and a transparent lens directed through the body tube between the cylindrical web and the transparent flexible web for directing illumination interiorly of the body tube and to the convex lens.

* * * * *